(12) United States Patent
Pandey (10) Patent No.: US 8,265,075 B2
(45) Date of Patent: Sep. 11, 2012

(54) METHOD AND APPARATUS FOR MANAGING, CONFIGURING, AND CONTROLLING AN I/O VIRTUALIZATION DEVICE THROUGH A NETWORK SWITCH

(75) Inventor: Vijoy Pandey, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 263 days.

(21) Appl. No.: 12/725,007

(22) Filed: Mar. 16, 2010

(65) Prior Publication Data
US 2010/0232443 A1 Sep. 16, 2010

Related U.S. Application Data

(60) Provisional application No. 61/160,364, filed on Mar. 16, 2009.

(51) Int. Cl.
H04L 12/28 (2006.01)
(52) U.S. Cl. ............... 370/389; 370/386; 719/324
(58) Field of Classification Search .......... None
See application file for complete search history.

(56) References Cited

U.S. PATENT DOCUMENTS

| | | | |
|---|---|---|---|
| 7,324,512 B2 * | 1/2008 | Larson et al. | 370/389 |
| 7,782,869 B1 * | 8/2010 | Chitlur Srinivasa | 370/395.41 |
| 2002/0085586 A1 * | 7/2002 | Tzeng | 370/475 |
| 2008/0148295 A1 | 6/2008 | Freimuth et al. | |
| 2009/0089464 A1 | 4/2009 | Lach et al. | |
| 2009/0154469 A1 | 6/2009 | Winter | |
| 2010/0054260 A1 | 3/2010 | Pandey et al. | |

OTHER PUBLICATIONS

PCI-SIG SR-IOV Primer An Introduction to SR-IOV Technology, Intel LAN Access Division, Dec. 2008, pp. 1-21.

* cited by examiner

*Primary Examiner* — Duc C Ho
(74) *Attorney, Agent, or Firm* — Guerin & Rodriguez, LLP; Micahel A. Rodriguez (57) ABSTRACT

An apparatus and method bridges frames between entities running on the same server. The server has a physical network interface that supports I/O virtualization. The physical network interface has an IOV device with a bridging function capable of bridging frames between entities running on the server. A network switch has a physical port coupled to the server by a physical link and a switching fabric in communication with the physical port for transmitting and receiving Ethernet data frames to and from the IOV device. A control processor, in communication with the IOV device, configures the bridging function of the IOV device to bridge some frames locally within the server between the entities running on the server and to pass other frames through the IOV device over the physical link to the physical port and the switching fabric, so that the switching fabric bridges these other frames between the entities.

20 Claims, 5 Drawing Sheets

METHOD AND APPARATUS FOR MANAGING, CONFIGURING, AND CONTROLLING AN I/O VIRTUALIZATION DEVICE THROUGH A NETWORK SWITCH

RELATED APPLICATION

This application claims priority to and the benefit of U.S. Provisional Application No. 61/160,364, filed on Mar. 16, 2009, the entirety of which application is incorporated by reference herein.

FIELD OF THE INVENTION

The invention relates generally to data centers and data processing. More particularly, the invention relates to managing, configuring, and controlling a host's bridging device externally from a network switch.

BACKGROUND

Server virtualization in data centers is becoming widespread. In general, server virtualization describes a software abstraction that separates a physical resource and its use from the underlying physical machine. Most physical resources can be abstracted and provisioned as virtualized entities. Some examples of virtualized entities include the central processing unit (CPU), network input/output (I/O), and storage I/O.

Virtual machines (VMs), which are a virtualization of a physical machine and its hardware components, play a central role in virtualization. A virtual machine typically includes a virtual processor, virtual system memory, virtual storage, and various virtual devices. A single physical machine can host a plurality of virtual machines. Guest operating systems execute on the virtual machines, and function as though executing on real hardware.

A layer of software provides an interface between the virtual machines resident on a physical machine and the underlying physical hardware. Commonly referred to as a hypervisor or virtual machine monitor (VMM), this interface multiplexes access to the hardware among the virtual machines, guaranteeing to the various virtual machines safe and isolated use of the physical resources of the machine, such as the CPU, memory, storage, and network bandwidth.

Typical server virtualization implementations have the virtual machines share the physical network interface, network adapter, or network interface card (NIC) of the physical machine for performing external network I/O operations. The hypervisor typically provides a software-based virtual switched network (called a vswitch) that provides interconnectivity among the virtual machines on a single physical machine. The vswitch interfaces between the physical network interface of the physical machine and the virtual NICs (vNICs) of the virtual machines, each virtual machine having one or more associated vNICs. In general, each vNIC operates like a physical network interface, being assigned a MAC (Media Access Control) address that is typically different from that of the physical network interface. The vswitch performs the forwarding of packets to and from the various virtual machines and the physical network interface.

Software-based virtualization of the I/O, however, is time consuming and generally limits performance. Early efforts to reduce the burden on the vswitch (hence freeing up valuable CPU cycles on the hypervisor) and improve network I/O performance have produced network I/O hardware technology such as Virtual Machine Direct Queues (VMDq), which is an adaptation of the multi-queue NIC concept for virtual networking, where each queue pair (transmit and receive) is dedicated to a virtual machine. The NIC places outgoing packets from a given virtual machine into the transmit queue of that virtual machine and incoming packets addressed to the given virtual machine into its receive queue. The direct assignment of such queues to each virtual machine thus simplifies the handling of outgoing and incoming traffic, and avoids buffer copies, which engage CPU cycles.

Other industry efforts have led to new technologies being built into next generation NICs, Converged NICs (CNICs), and Converged Network Adaptors (CNAs), technologies that seek to improve the performance of switching traffic between virtual machines within a single hypervisor by bypassing the hypervisor's vswitch, such technologies including PCI SR-IOV (Peripheral Component Interconnect Single-Root I/O Virtualization) and MR-IOV (Multi-Root I/O Virtualization. For example, SR-IOV (Peripheral Component Interconnect Single-Root I/O Virtualization) technology partitions a single network interface into multiple virtual functions. Virtual machines can directly access the physical resource (i.e., the network interface) through the virtual functions without having to rely on the hypervisor for control or data operations. To bypass the vswitch in this fashion, traffic switching between VMs occurs either in the NIC or in an external switching device (e.g., a Layer-2 edge switch).

One proposed technique, called VEB (Virtual Ethernet Bridging), performs intra-hypervisor, VM-to-VM traffic switching within the physical network interface. Another proposed technique, called VEPA (Virtual Ethernet Port Aggregator), switches the intra-hypervisor VM-to-VM traffic at an edge network device, its rationale being that full switching functionality in NIC hardware would be technically challenging and expensive to implement, compared to the incremental change required to implement VEPA. Yet another proposed technique, called Port Extenders, switches such VM-to-VM traffic several network devices removed from the hypervisor, for example, at a core network switch of a hierarchical network infrastructure.

SUMMARY

In one aspect, in a system comprising a server in communication with an external switching device over a physical link, the server having an input/output virtualization (IOV) device that is in communication with the external switching device over the physical link, the invention features a method for bridging frames sent from a source entity to a destination entity, both entities running on the server. The method comprises configuring the IOV device to bridge some frames locally within the IOV device at the server from the source entity to the destination entity and to pass other frames through the IOV device to the external switching device for bridging these other frames between the entities by the external switching device.

In another aspect, the invention features a network switch comprising a physical port in communication over a physical link with a physical network interface of a server. The physical network interface has an IOV device with a bridging function capable of bridging frames between entities running on the server. A switching fabric is coupled to the physical port to transmit frames to and receive frames from the IOV device. A control processor, in communication with the IOV device, configures the bridging function of the IOV device to bridge some frames locally within the server between the entities running on the server and to pass other frames through the IOV device over the physical link to the switching fabric, for bridging by the switching fabric of these other frames between the entities.

In still another aspect, the invention features a data center comprising a server having a physical network interface that supports I/O virtualization. The physical network interface has an IOV device with a bridging function capable of bridging frames between entities running on the server. A network switch has a physical port coupled to the server by a physical link and a switching fabric in communication with the physical port for transmitting and receiving Ethernet data frames to and from the IOV device. A control processor, in communication with the IOV device, configures the bridging function of the IOV device to bridge some frames locally within the server between the entities running on the server and to pass other frames through the IOV device over the physical link to the physical port and the switching fabric, so that the switching fabric bridges these other frames between the entities.

In still another aspect, the invention features a physical network interface, comprising an IOV device with a configurable bridging function for bridging frames between entities running on a server. A port receives a frame from a source entity running on the server targeted to a destination entity running on the server. A processing element bridges the frame locally within the IOV device if the bridging function is capable of and configured to bridge the frame locally to the destination entity, and otherwise transmits the frame through an Ethernet port over a physical link to an external switching device, so that the external switching device bridges the frame between the source and destination entities.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

Data centers described herein include one or more physical machines (servers) in communication with an external switching device (e.g., an Ethernet switch). Each physical machine has a physical network interface that supports I/O virtualization. Examples of such physical network interfaces include SR-IOV and MR-IOV devices. These physical network interfaces, also referred to herein generally as IOV devices, have bridging capabilities for bridging data units locally between entities operating on the same physical machine. Entities, as described herein, can be physical or virtual. Examples of such entities include, but are not limited to, application programs, operating systems, virtual machines, hypervisors, virtual NICs, virtual and physical NIC queues and sub-NICs, virtual and physical network I/O interfaces, and virtual and physical storage I/O interfaces.

The external switching device includes a control processor that becomes aware of the bridging functions of those IOV devices to which the external switching device is in communication. Software executed by the control processor operates to manage, configure, and control the bridging function of the IOV device, so that these bridging functions cooperate with the bridging capability of the external switching device. In effect, the software provides an abstraction, wherein the bridging functions of the IOV devices are logically deemed part of the external switching device for purposes of switching, configuration, control, and management.

By this management, configuration, and control the bridging function, the control processor can capitalize on the advantages of local bridging at the server for some frames—improved performance and reduced latency—while offloading select frames associated with complex tasks to the switching fabric on the external switching device. The software executed by the control processor identifies such complex tasks, configuring the bridging function to expose or pass-through the physical and virtual functions (v-ports) associated with these complex tasks to the external switching device, which performs the bridging, while locally bridging frames associated with simple tasks.

Figure 1:
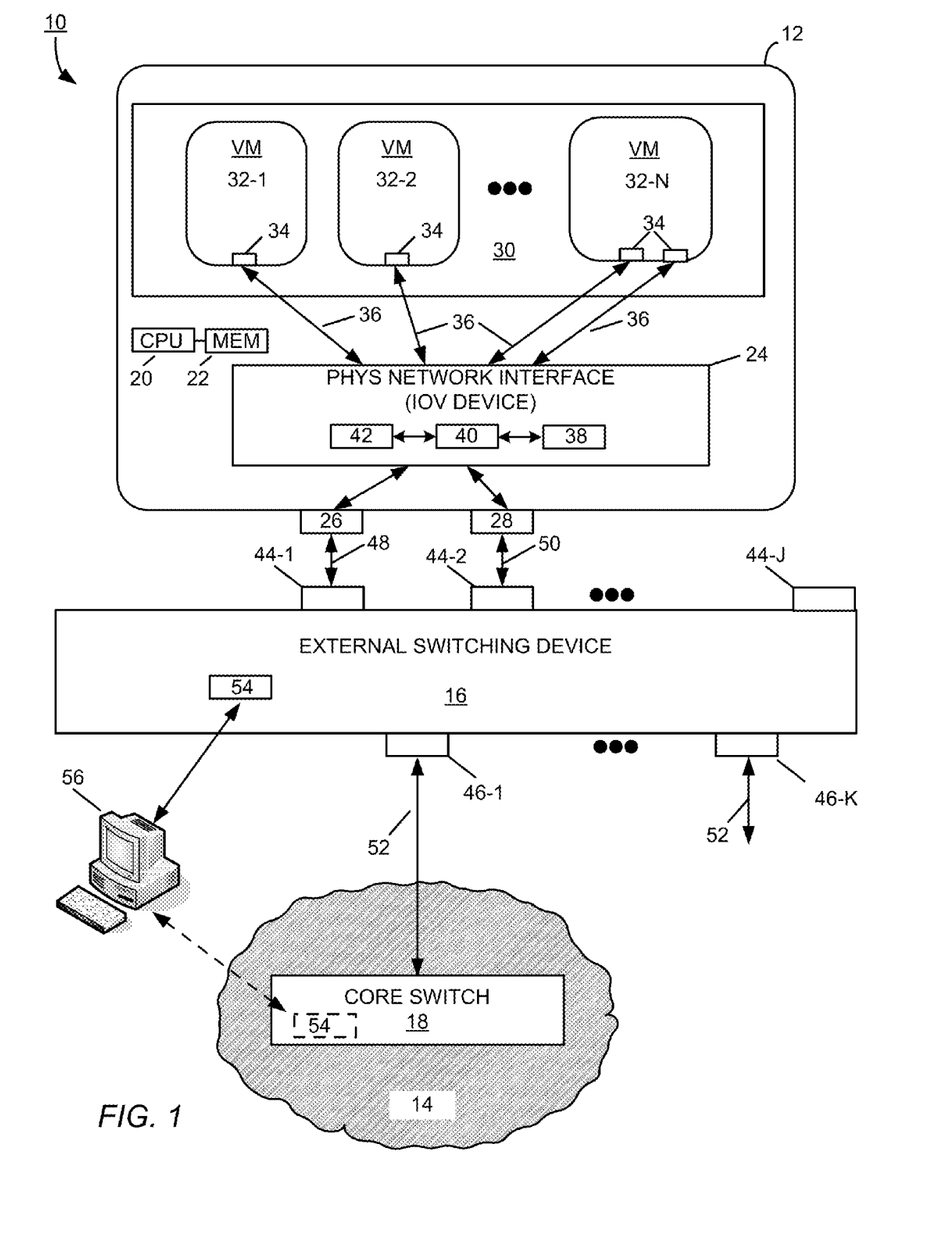
FIG. 1 is a diagram of an embodiment of a data center with an external switching device and a physical machine (host) having a physical network interface (IOV device) in communication with virtual machines running on the physical machine and with the external switching device.

FIG. 1 shows an embodiment of an oversimplified data center 10 including a physical machine 12 (host) in communication with a network 14 through an external switching device 16. Here, "external" refers to the physical independence (i.e., separation) of the external switching device from the physical machine. In general, a data center is a location that serves as a computational, storage, and networking center of an organization. The equipment of a data center can reside together locally at a single site or distributed over two or more separate sites. Typically, the data center 10 includes more physical machines and more external switches than the one physical machine 12 and the one external switching device 16 shown. In addition, although not shown, the data center 10 can have aggregator and gateway switches interposed between the external switching device 16 and the network 14. Moreover, such aggregator and gateway switches, and the external switching device 16, can be considered part of the network 14. The network 14 can be, for example, an intranet, an extranet, the Internet, a local area network (LAN), wide area network (WAN), or a metropolitan area network (MAN), or any combination thereof. Here, the network 14 includes a core switch 18 with which the external switching device 16 is in communication.

The physical machine 12 is an embodiment of a physical computing device, such as a server or server blade, and includes hardware such as a processor 20, system memory 22, a physical network interface 24, a physical in-band port 26, and a physical out-of-band port 28. The in-band port 26 serves to transport data traffic, such as Ethernet-based data frames, and the out-of-band port 28 serves to carry frames outside of the data stream. Other embodiments of the physical machine 12 can have more than one processor 20, physical network interface 24, in-band port 26, and out-of-band port 28. The physical machine 12 can be installed within a chassis alone or with other physical machines (e.g., as in a rack server or in a blade server); the external switching device 16 can reside alone or be installed within the same equipment chassis as the physical machine 12.

In one embodiment, the physical machine 12 runs virtualization software including hypervisor software 30 for abstracting the hardware of the physical machine 12 (e.g., the processor 20 and memory 22) into virtual machines 32-1, 32-2, 32-N (generally, 32). Although described herein primarily with reference to a physical machine that runs virtualization software, the principles set forth apply also to physical machines running a non-virtualized operating system, provided such physical machines include a physical network interface with an IOV device as described herein.

Each virtual machine 32 includes at least one application (e.g., a database application) executing within its own guest operating system. Generally, any type of application can execute on a virtual machine. An example of virtualization software for implementing virtual machines on a physical machine is VMware ESX Server™, produced by VMware® of Palo Alto, Calif. Other examples of virtualization software include XenSource™ produced by Citrix of Ft. Lauderdale, Fla., Hyper-V™ produced by Microsoft of Redmond, Wash., KVM produced by RedHat of Raleigh, N.C., Virtuozzo™ produced by SWsoft of Herndon, Va., and Virtual Iron produced by Virtual Iron Software of Lowell, Mass.

Associated with each virtual machine 32 are one or more virtual interfaces (VIF) 34, such as a virtual NIC or vNIC. Each VIF 34 has its own unique virtual MAC address (vMAC). For example, virtual machines 32-1, 32-2 both have one VIF 34, and virtual machine 32-N has two VIFs 34. VIFs 34 include those that handle data networking communications and storage communications. Through the hypervisor software 30, the VIFs 34 are logically connected to the physical network interface 24, signified by virtual links 36. The virtual links 34 are embodied by physical or virtual functions.

The physical network interface or IOV device 24 is generally a network I/O device that provides support in hardware, software, or a combination thereof for any form of I/O virtualization (IOV). Examples of the IOV device 24 include, but are not limited to, PCI-SIG-compliant SR-IOV devices and non-SR-IOV devices, PCI-SIG-compliant MR-IOV devices, multi-queue NICs (network interface controllers), I/O adapters, converged NICs, and converged network adapters (CNA). These IOV devices provide various deployment options for configuring the network topology of a virtualized data center. They can provide physical functions to a non-virtualized operating system (OS), which are visible as multiple sub-NICs to the OS, and virtual functions to virtual machines (VMs), which are visible as virtual NICs (vNICs) to the VMs or as virtual Host Bus Adapters (vHBAs) for storage. These physical and virtual functions available to the CPU of a server are seen as virtual ports or v-ports, when exposed to an external switching device.

In addition, the advantages brought by SR-IOV and MR-IOV within a NIC are many-fold: they enable the partition of work between NICs and switches to leverage their respective strengths; they provide visibility of the vNICs and the multiple physical sub-NICs to external devices; they help solve a host of multicast and broadcast issues that arise when a physical port from and external switching device is connected to an SR-IOV-capable NIC. An advantage specific to MR-IOV is the ability to share the NIC among the multiple CPUs or hosts that control it. In addition to handling the network I/O sent to and received from the external switching device 16, the IOV device 24 provides a local bridging function 38 (within an SR-IOV device, such a bridging function is also known as a Virtual Ethernet Bridge or VEB). The bridging function enables bypass of any switch software (i.e., a vswitch) within the hypervisor software 30 when switching data units (e.g., frames, packets) between virtual machines 32 on the same physical machine 12.

The IOV device 24 includes a processing element 40 and a MAC address lookup table 42 for maintaining the MAC addresses of the virtual machines 32 running on the physical machine 12. The number of MAC addresses in the lookup table 42 is generally orders of magnitude smaller in the IOV device 24 than those tables typically maintained in a network switch, such as external switching device 16; such a lookup table 42 can be implemented in hardware. The IOV device 24 can include memory (not shown) for buffering data units received from a source virtual machine and awaiting forwarding to a destination virtual machine.

The external switching device 16 includes a plurality of physical downlink ports 44-1, 44-J (generally, 44) and a plurality of physical uplinks port 46-1, 46-K (generally, 46). Through the downlink ports 44, the external switching device 16 connects to one or more physical machines (specifically, the IOV devices of those physical machines). In this example, the downlink port 44-1 is directly connected to the physical port 26 of the physical machine 12 by physical link 48 and the downlink port 44-2 is directly connected to the physical port 28 of the physical machine 12 by physical link 50. In one embodiment, the physical link 48 is a 10 Gbps Ethernet link, and the physical link 50 is a serial connection, for example, and $I^2C$ bus. The uplink ports 46 serve to connect the external switching device 16 to the network 14 (or to aggregator and/or gateway switches) over physical links 52. As an example, uplink port 46-1 connects the external switching device 16 to the core switch 18 on the network 14. The external switching device 16 can have fewer or more physical downlink ports and fewer or more physical uplink ports than those shown.

In general, the external switching device 16 is a network element capable of processing and switching units of data (e.g., packets, frames, protocol data units (PDUs), datagrams, cells) based on virtual ports (or v-ports). Such a network switch is also referred to as "v-port switch". Implementations of v-port switches are described in U.S. patent application Ser. No. 12/550,173, filed Aug. 28, 2009, and titled "Apparatus and Method of Switching Packets between Virtual Ports", the entirety of which patent application is incorporated by reference herein.

As described herein, a management module 54 of the external switching device 16 configures the external switching device 16 and the IOV device 24 to share frame-bridging duties. An example implementation of the external switching device 16 is an Ethernet switch (e.g., a 24-port 10 Gb Ethernet switch module manufactured by Blade Network Technologies, Inc. of Santa Clara, Calif.).

In one embodiment, the data center 10 includes a remote computing station 56 that is in communication with the external switching device 16. The computing station 56 serves as a point of management from which an administrator can manage, configure, and control the IOV device 24 and the external switching device 16. From the computing station 56, the administrator runs an application program (e.g., Java-based or CLI-based) that issues commands to the external switching device 16. In an alternative embodiment (shown in dashed lines), the remote computing station 56 can communicate instead with a management module 54 operating on the core switch 18. In general, the management, control, configuration, and bridging principles described herein with respect to the external switching device 16 can be implemented alternatively at the core switch 18.

Figure 2:
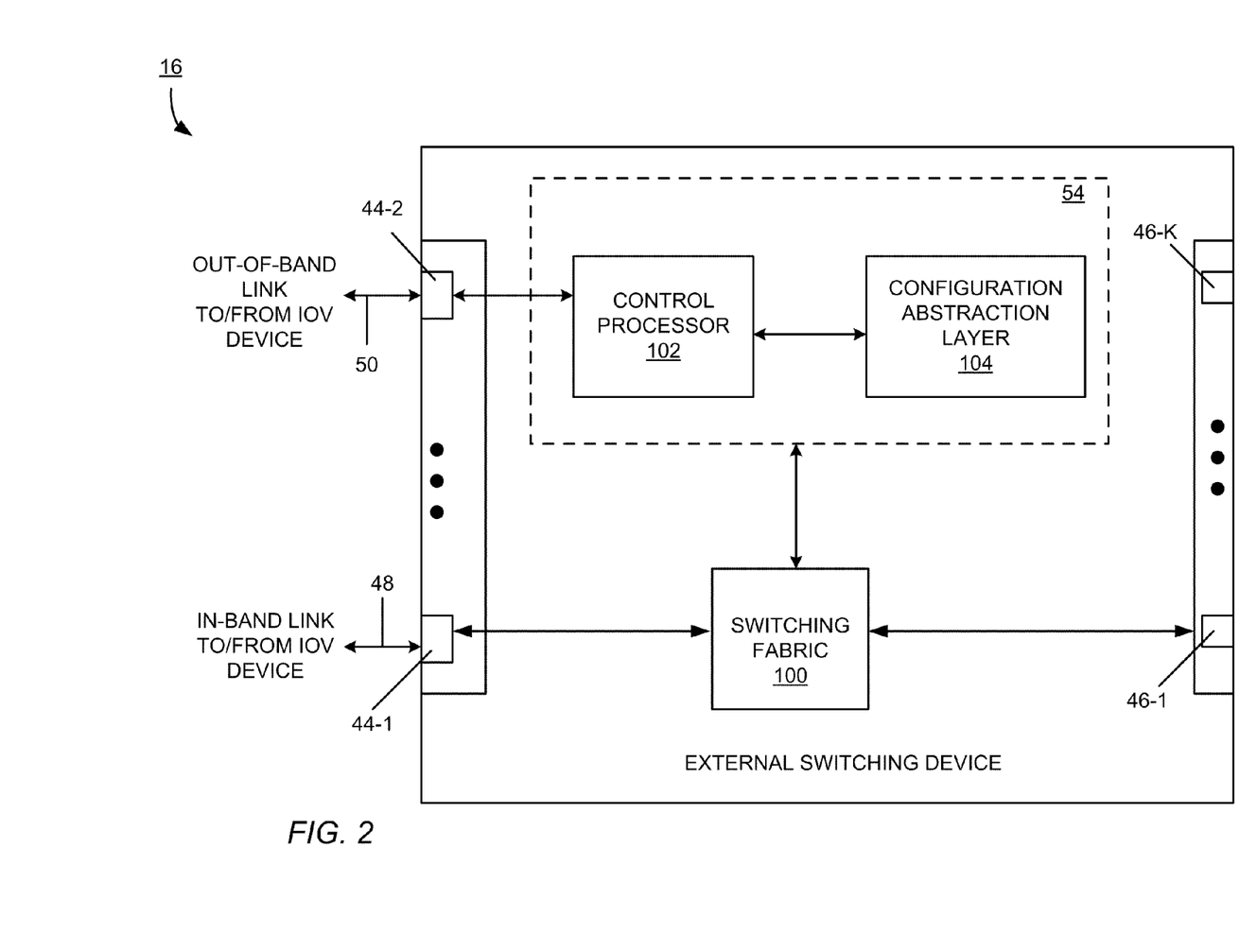
FIG. 2 is a functional block diagram of an embodiment of the external switching device.

FIG. 2 shows a functional block diagram of an embodiment of the external switching device 16, including the physical downlink ports 44, the physical uplink ports 46, and the management module 54. The management module 54 is in communication with in communication with a switching fabric 100 for switching data units between the physical downlink 44 and uplink ports 46.

The switching fabric 100 can be implemented as an OSI Layer 2 switch that applies traffic handling policies to traffic switching between physical ports. The switching fabric 100 can be embodied in one or more custom semiconductor integrated circuits (IC), such as an application-specific integrated circuit (ASIC), application specific standard product (ASSP), or field-programmable gate array (FPGA) semiconductor device. Although shown as separate from the switching fabric 100, the management module 54 can be implemented within the ASIC or FPGA of the switching fabric 100.

Included in the management module 54 is a control processor 102 that executes a configuration abstraction layer 104. In one embodiment, the configuration abstraction layer 104 is a software program executed by the control processor 102 to manage, configure, and control the bridging function 38 of each IOV device connected to one of the downlink ports 44. Alternatively, configuration abstraction layer 104 may be implemented in firmware.

The control processor 102 executes the configuration abstraction layer 104 in order to manage, configure, and control the bridging function of the IOV device. The control processor 102 achieves this configuration, control and management by sending commands or messages to the IOV device 24 (commands manipulate the IOV device directly, messages indirectly, and as used herein, the term "instruction" encompasses both commands and messages). The transmission of instructions between the external switching device 16 and the IOV device uses either an in-band or an out-of-band mechanism. The in-band mechanism operates over an in-band communication path that includes the Ethernet link 48 connecting the external switching device 16 to the IOV device 24; the out-of-band mechanism operates over an out-of-band communication path that includes another link 50 between the external switching device and the IOV device, for example, a second Ethernet link or an I$^2$C bus. Using one of these mechanisms, the control processor 102 sends instructions to the IOV device through the switching fabric 100 or directly.

The instructions, when received by the IOV device, whether received through the in-band or out-of-band mechanism, can operate to manage, configure, and control the IOV device directly. Alternatively, an IOV driver (firmware) or higher-layer software can trap instructions, and then manage, configure, and control the IOV device in accordance with the trapped instructions.

During operation, the external switching device 16 and the IOV device 24 participate in an initialization phase, followed by run-time operation. (When there is more than one IOV device, there is an initialization phase and run-time operation between the external switching device 16 and each IOV device.) The initialization phase includes a probe and discovery phase, a capabilities exchange phase, a service agreement and initial configuration phase, and a topology-building phase. This initialization produces an aggregate bridging capability, which is a combination of the bridging functionality of each IOV device with the bridging functionality of the switching fabric of the external switching device. This aggregate bridging capability is referred to herein logically as an eSwitch; the bridging capability of the eSwitch comprises the bridging capability of its switching fabric 100 and the bridging capability of each IOV device 24. After initialization completes, the eSwitch exposes and advertises this aggregate bridging capability to the network 14. Such exposure and advertisement occurs through probe and discovery initiated by other network devices in the network, through probe and discovery by network management software, or when a user logs into the eSwitch in order to manage it.

Figure 3:
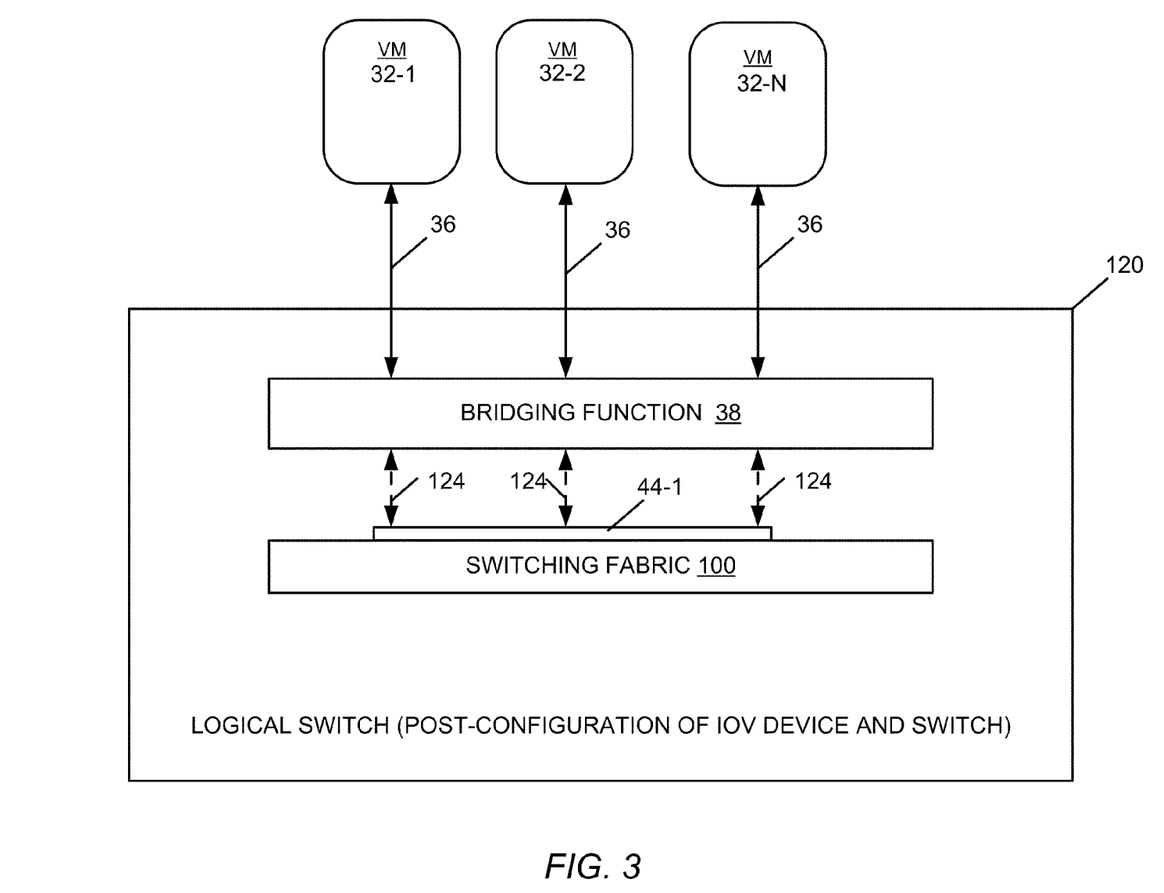
FIG. 3 is a functional block diagram of a logical network switch produced in response to managing, configuring, and controlling the IOV device and external switching device.

FIG. 3 shows an embodiment of a logical eSwitch 120 produced in response to configuring the bridging function of the IOV device 24 from the external switching device 16. The logical eSwitch 120 represents an aggregation of bridging capability comprised of the bridging function 38 of the IOV device 24 and the switching capability of the switching fabric 100 of the external switching device 16. Although only one bridging function is shown, the logical eSwitch 120 can include a bridging function for each IOV device with which the external switching device is in communication. In brief overview, the bridging function 38 receives frames from the virtual machines 32 over virtual links 36. Based on the configuration of the IOV device, the bridging function 38 performs the switching for some received frames, while passing other received frames, signified by arrows 124, through to the switching fabric 100 for switching. Passed-through frames arrive at the external switching device through physical port 44-1.

Figure 4:
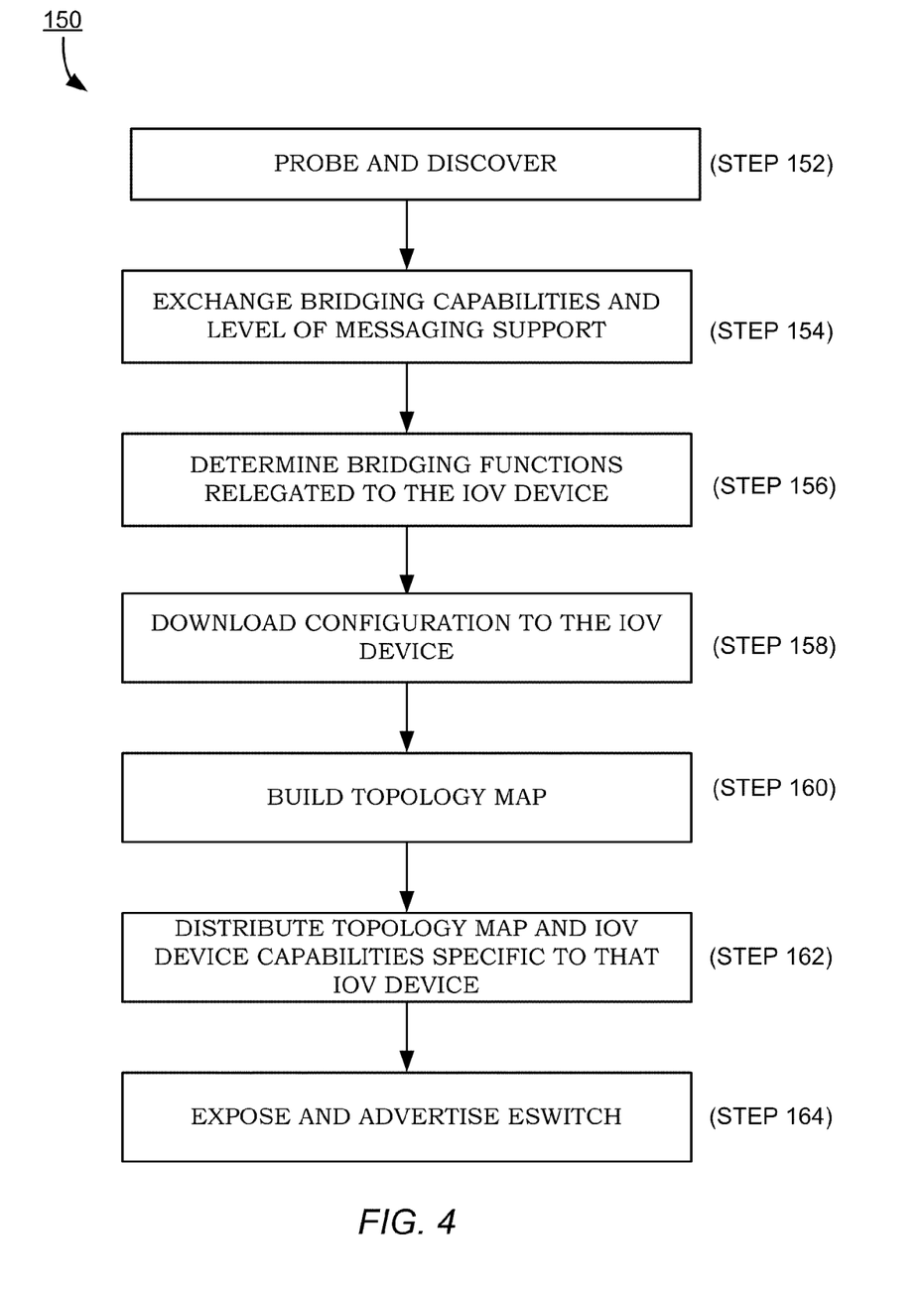
FIG. 4 is a flow diagram of an embodiment of a process for initializing the logical network switch.

FIG. 4 shows an embodiment of an initialization process 150 for configuring the IOV device and the external switching device to share the role of switching frames between entities on the same physical machine. In the description of the process, reference is made to various elements described in connection with FIG. 1 and FIG. 2. The flow diagram illustrating the process is not intended to imply a particular order of steps; some of the steps can occur concurrently or in a different order from that shown.

The initialization process 150 is described with respect to one IOV device; the process is similar for each IOV device with which the external switching device 16 is in communication. As part of the initialization phase, during the probe and discovery phase, the external switching device 16 and IOV device discover (step 152) each other. The external switching device 16 probes for the existence of IOV devices on each of its downlink ports 44; alternatively, or in conjunction with the probing from the external switching device, the IOV device can proactively announce its presence on a downlink port.

In general, throughout the initialization phase, messaging between the external switching device and an IOV device can occur through either an in-band or an out-of-band mechanism, as previously described. Accordingly, the probing by the external switching device and the announcing by the IOV device can be performed in-band (over an in-band port) or out-of-band (through an out-of-band port). The protocol employed by the external switching device and IOV device depends upon whether the messaging is in-band or out-of-band. Typically, the external switching device uses an Ethernet-based frame to serve as an in-band probe, with any response from an IOV device being Ethernet-based; and an out-of-band probe can occur in accordance with a non-Ethernet protocol, such as a serial connection or over I$^2$C.

After the external switching device and IOV device recognize each other, the initialization process moves to the capabilities exchange phase. During the capabilities exchange phase, the external switching device 16 and the IOV device 24 exchange (step 154) their capabilities for bridging capacity (i.e., table sizes) and their level of support for messaging related to the service agreement phase and to the run-time state machine. Both the external switching device and the IOV device negotiate and agree on the bridging capability support that each is to provide. Based on various factors, for example, user input, the external switching device may decide not to use the full bridging capability of the IOV device. Through the capability exchange process, the external switching device can negotiate a less-than-full bridging capability on the IOV device; in addition, this less-than-full capability can degenerate to no bridging to be provided by the IOV device at all. Further, the external switching device and the IOV device agree upon a common messaging support; that is, the devices determine whether the messaging will be in-band or out-of-band, as well as the subset of commands and messages that each device supports. For example, some types of IOV devices may not have implemented call commands and/or messages needed by the external switching device to manage, configure, or control the IOV device, and the external switching device is thus limited to the subset of such commands and messages upon which the devices agree.

After completing the exchange of capabilities, the external switching device examines the agreed-to bridging capabilities of the IOV device, and, in view of such capabilities, determines (step 156) what bridging functions the IOV device can perform, and can be relegated to the IOV device. As examples, the software executed by the control processor can configure the IOV device to locally bridge unicast data frames targeted by a source entity to just one destination entity, while passing multicast and broadcast messages through to the external switching device such that multicast or broadcast replication can take place on the external switching device. As another example, the IOV device can perform limited access control list (ACL) functionality, such as a "deny" based on simple packet matches (e.g., source address), while the packet is passed to the external switching device for more sophisticated ACL actions and packet matching, e.g., redirection based on deeper OSI Layer 4-7 inspection of the payload. And yet another example, the IOV device can perform limited Quality of Service guarantees, such as enforcing bandwidth for only outgoing traffic, while the external switching device can provide more involved bidirectional bandwidth guarantees, in concert with end-to-end service agreements in the network.

In response to this determination, the external switching device downloads (step 158) the initial configuration to the IOV device. The external messaging uses the agreed-upon messaging mechanism. The initial configuration enables the particular bridging functions on the IOV device. Other bridging functions are typically left to the responsibility of the external switching device.

After the configuration of the IOV device, the external switching device builds (step 160) a topology map of all IOV devices coupled to the downlink ports (determined during the probe and discovery phase), the bridging capabilities of those IOV devices (determined during the capabilities exchange phase), and the distribution of bridging responsibilities established among the switching fabric of the external switching device and the bridging functions of the IOV devices (established during the service agreement phase). The external switching device then distributes (step 162) to each IOV device the topology map and capabilities specific to that IOV device.

The initialization phase is deemed complete after construction and distribution of the topology map and IOV device capabilities. The external switching device exposes and advertises (step 164) the aggregate bridging capability (i.e., the eSwitch), comprised of the bridging capabilities of each IOV device and its switching fabric 100, to the network 14.

After the initialization phase completes, the external switching device and IOV devices are prepared to process packet traffic. During run-time operation, three kinds of events can occur, which the external switching device is prepared to handle: (1) configuration change events; (2) receipt of an Ethernet control frame; and (3) receipt of an Ethernet data frame.

Configuration change events typically occur in response to a user action. The user action can occur on the server (i.e., the host or physical machine) and be directed towards the IOV device, or on the external switching device, being directed towards the external switching device or the eSwitch as a whole. If a configuration change event takes place on the IOV device from the server, the IOV device communicates those changes to the external switching device in accordance with the agreed-upon messaging support. In response to this communication, the external switching device updates its topology map. If a configuration change event takes place at the external switching device, the external switching device determines whether the configuration belongs to its switching fabric or to a connected IOV device based on the configuration target. If the change is applicable to an IOV device, the external switching device uses the messaging support to update the changes to the IOV device. If the change is applicable to its switching fabric, then the external switching device updates the switching fabric locally. The external switching device then appropriately updates its topology map.

When the eSwitch receives an Ethernet control frame, defined as a frame that changes the state of the bridging device, the control frame being received on a function (physical or virtual) of the IOV device or on a downlink port of the switching fabric of the external switching device, the control frame passes to the control processor 102 of the external switching device, irrespective of which bridging device received the control frame, namely, the IOV device or the external switching device The control processor, running algorithms and heuristics, computes any required state changes, and determines the bridging device affected (i.e., the IOV device or switching fabric), based on the content in this control frame, the bridging device on which the control frame arrived, and the topology map of the external switching device The external switching device communicates the new state to the affected device; the communication occurring locally, if applicable to the switching fabric, or through the messaging mechanism, if applicable to an IOV device.

Figure 5:
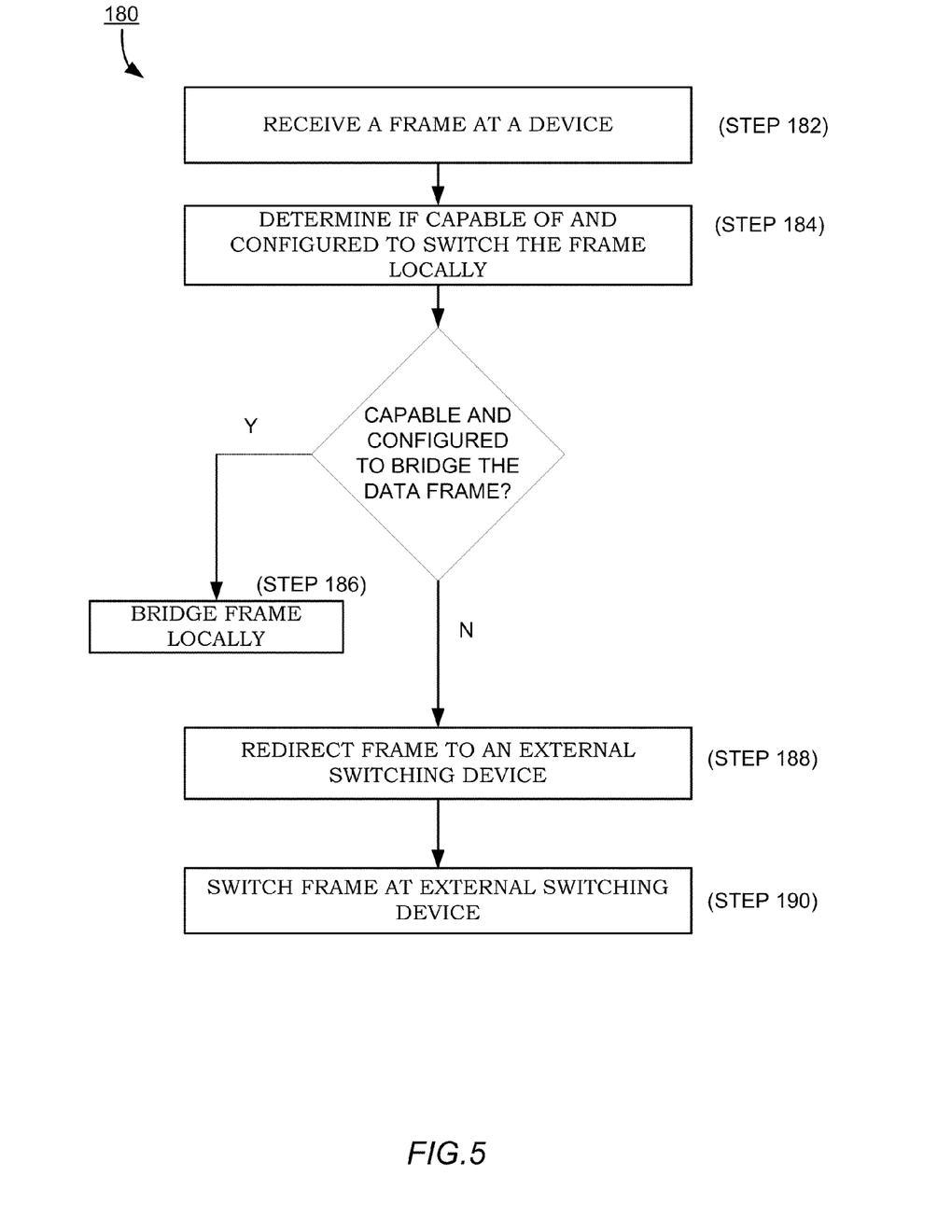
FIG. 5 is a flow diagram of an embodiment of a process for bridging data frames between entities running on the same physical machine.

FIG. 5 shows an embodiment of a process 180 for switching frames sent from a source entity to a destination entity on the same physical machine. In the description of the process, reference is made to various elements described in connection with FIG. 1, FIG. 2, and FIG. 3. The flow diagram illustrating the process is not intended to imply a particular order of steps; some of the steps can occur concurrently or in a different order from that shown.

At step 182, the eSwitch 120 receives an Ethernet data frame, defined as a frame that is typically bridged without changing the state of the bridging device. The data frame is received on a function (physical or virtual) of the IOV device 24 over a virtual link 36 (e.g., PCIe link) or on a downlink port 44 of the switching fabric 100 of the external switch 16. For example, the data frame may originate from the hypervisor 30 or directly from a virtual machine 32, with one of the virtual machines (e.g., 32-1) being the source of the data frame, and another virtual machine (e.g., 32-2) on the same physical machine 12 being the destination. As other examples, a data frame can arrive destined to another virtual machine on another eSwitch through a core switch, or destined to another virtual machine on another IOV device connected to the same eSwitch. To determine whether the original packet is an intra-server communication, the IOV device 24 compares the destination MAC address with the MAC addresses in its lookup table 42. A matching address tells the IOV device 24 to treat the arriving data frame differently from an outgoing data targeted to a remote destination (a physical machine other than the physical machine from which the data frame originates).

For an intra-server communication, the eSwitch 120 consults (step 184) the generated topology map and the bridging capabilities of the device on which the data frame arrived (i.e., the IOV device or switching fabric). If the bridging device (i.e., the IOV device or switching fabric) is capable of and configured for bridging the data frame, that device locally bridges (step 186) the data frame. If incapable of or not configured for bridging the data frame, the bridging device redirects (step 188) the data frame (i.e., passes-through) to an external switching device, where the switching fabric of that external switching device performs (step 190) the bridging.

For example, consider that the IOV device 24 receives a data frame on a virtual function over a virtual link 36. The IOV device 24 consults its topology map to determine whether the IOV device is capable of and configured to bridge the data frame. If incapable of or not configured for bridging the data frame, the IOV device passes the data frame through to the external switching device 16 over the physical link 48. The switching fabric 100 of the external switching device 16 receives the data frame through physical downlink port 44-1, and performs the bridging, returning the data frame to the IOV device over the physical downlink port 44-1 and physical link 48. If, instead, the IOV device is capable of and configured for bridging the data frame, the IOV device performs the bridging locally on the server. Preferably, if bridging the data frame locally, the IOV device does not send the data frame to the external switching device, thereby conserving bandwidth of the Ethernet link 48 between the devices. Alternatively, the IOV device can send a copy of the frame, or of a portion of the frame, so that the external switching device 16 can use it to perform switching functions, such as traffic shaping, snooping, or analysis.

Consider, as another example, that the switching fabric 100 receives a data frame on one of its downlink ports 44. The control processor 102 examines the data frame and consults its topology table to determine whether the switching fabric is capable of or configured to bridge the data frame. If the switching fabric is capable of and configured for switching the data frame, the external switching device 16 performs the switching, returning the data frame through the same physical downlink port 44-1 and over the same physical link 48 by which the data frame arrived. If incapable of or not configured for switching the data frame, the switching fabric can pass the data frame through an uplink port to, for example, the core switch, and the core switch can perform the switching.

Embodiments of the described invention may be implemented in one or more integrated circuit (IC) chips manufactured with semiconductor-fabrication processes. The maker of the IC chips can distribute them in raw wafer form (on a single wafer with multiple unpackaged chips), as bare die, or in packaged form. When in packaged form, the IC chip is mounted in a single chip package, for example, a plastic carrier with leads affixed to a motherboard or other higher-level carrier, or in a multichip package, for example, a ceramic carrier having surface and/or buried interconnections. The IC chip is then integrated with other chips, discrete circuit elements, and/or other signal processing devices as part of either an intermediate product, such as a motherboard, or of an end product. The end product can be any product that includes IC chips, ranging from electronic gaming systems and other low-end applications to advanced computer products having a display, an input device, and a central processor.

As will be appreciated by one skilled in the art, aspects of the present invention may be embodied as a system, method, and computer program product. Thus, aspects of the present invention may be embodied entirely in hardware, entirely in software (including, but not limited to, firmware, program code, resident software, microcode), or in a combination of hardware and software. All such embodiments may generally be referred to herein as a circuit, a module, or a system. In addition, aspects of the present invention may be in the form of a computer program product embodied in one or more computer readable media having computer readable program code embodied thereon.

The computer readable medium may be a computer readable storage medium, examples of which include, but are not limited to, an electronic, magnetic, optical, electromagnetic, infrared, or semiconductor system, apparatus, or device, or any suitable combination thereof. As used herein, a computer readable storage medium may be any tangible medium that can contain or store a program for use by or in connection with an instruction execution system, apparatus, device, computer, computing system, computer system, or any programmable machine or device that inputs, processes, and outputs instructions, commands, or data. A non-exhaustive list of specific examples of a computer readable storage medium include an electrical connection having one or more wires, a portable computer diskette, a floppy disk, a hard disk, a random access memory (RAM), a read-only memory (ROM), a USB flash drive, an non-volatile RAM (NVRAM or NOVRAM), an erasable programmable read-only memory (EPROM or Flash memory), a flash memory card, an electrically erasable programmable read-only memory (EEPROM), an optical fiber, a portable compact disc read-only memory (CD-ROM), a DVD-ROM, an optical storage device, a magnetic storage device, or any suitable combination thereof.

Program code may be embodied as computer-readable instructions stored on or in a computer readable storage medium as, for example, source code, object code, interpretive code, executable code, or combinations thereof. Any standard or proprietary, programming or interpretive language can be used to produce the computer-executable instructions. Examples of such languages include C, C++, Pascal, JAVA, BASIC, Smalltalk, Visual Basic, and Visual C++.

Transmission of program code embodied on a computer readable medium can occur using any appropriate medium including, but not limited to, wireless, wired, optical fiber cable, radio frequency (RF), or any suitable combination thereof.

The program code may execute entirely on a user's computer, partly on the user's computer, as a stand-alone software package, partly on the user's computer and partly on a remote computer or entirely on a remote computer or server. Any such remote computer may be connected to the user's computer through any type of network, including a local area network (LAN) or a wide area network (WAN), or the connection may be made to an external computer (for example, through the Internet using an Internet Service Provider).

While the invention has been shown and described with reference to specific preferred embodiments, it should be understood by those skilled in the art that various changes in form and detail may be made therein without departing from the spirit and scope of the invention as defined by the following claims.

What is claimed is:

1. A method for bridging frames sent from a source entity to a destination entity, both entities running on a server of a system that comprises the server in communication with an external switching device over a physical link, the server having an input/output virtualization (IOV) device that is in communication with the external switching device over the physical link, the method comprising configuring the IOV device to bridge some frames locally within the IOV device at the server from the source entity to the destination entity and to pass other frames through the IOV device to the external switching device for bridging these other frames between the entities by the external switching device.

2. The method of claim 1, further comprising learning, by the external switching device, of each physical and virtual function exposed by the IOV device.

3. The method of claim 1, further comprising exchanging bridging capabilities between the IOV device and the external switching device.

4. The method of claim 3, wherein configuring the configuring the IOV device includes configuring less than full bridging capability of the IOV device.

5. The method of claim 1, wherein configuring the IOV device includes transmitting an instruction from the external switching device to the IOV device over an in-band communication path, the instruction operating to configure the IOV device.

6. The method of claim 5, wherein the in-band communication path includes an Ethernet link.

7. The method of claim 1, wherein configuring the IOV device includes transmitting an instruction from the external switching device to the IOV device over an out-of-band communication path, the instruction operating to configure the IOV device.

8. The method of claim 1, further comprising advertising over a network, by the external switching device, an aggregate bridging capability comprised of a bridging function of the IOV device and a bridging capability of the external switching device.

9. The method of claim 1, wherein the IOV device is a SR-IOV (single-root input/output virtualization) device or a MR-IOV (multi-root input/output virtualization) device.

10. A network switch, comprising:
a physical port in communication over a physical link with a physical network interface of a server, the physical network interface having an IOV device with a bridging function capable of bridging frames from a source entity to a destination entity, both entities running on the server;
a switching fabric coupled to the physical port to transmit frames to and receive frames from the IOV device; and
a control processor, in communication with the IOV device, configuring the bridging function of the IOV device to bridge some frames locally within the server between the entities running on the server and to pass other frames through the IOV device over the physical link to the switching fabric, for bridging by the switching fabric of these other frames between the entities.

11. The network switch of claim 10, wherein the control processor communicates with the IOV device to learn of each physical and virtual function exposed by the IOV device.

12. The network switch of claim 10, wherein the control processor and the IOV device exchange bridging capabilities.

13. The network switch of claim 12, wherein the control processor determines to use less than full bridging capability of the IOV device.

14. The network switch of claim 10, wherein the control processor configures the IOV device by transmitting an instruction to the IOV device over an in-band communication path.

15. The network switch of claim 14, wherein the in-band communication path includes an Ethernet link.

16. The network switch of claim 10, wherein the control processor configures the IOV device by transmitting an instruction to the IOV device over an out-of-band communication path.

17. The network switch of claim 10, wherein the control processor advertises over a network an aggregate bridging capability comprised of the configured bridging function of the IOV device and the bridging capability of the switching fabric.

18. A data center, comprising:
a server having a physical network interface that supports I/0 virtualization, the physical network interface having an IOV device with a bridging function capable of bridging frames from a source entity to a destination entity, both entities running on the server;
a network switch having a physical port coupled to the server by a physical link and a switching fabric in communication with the physical port for transmitting and receiving Ethernet data frames to and from the IOV device; and
a control processor, in communication with the IOV device, configuring the bridging function of the IOV device to bridge some frames locally within the server between the entities running on the server and to pass other frames through the IOV device over the physical link to the physical port and the switching fabric, so that the switching fabric bridges these other frames between the entities.

19. A physical network interface, comprising:
an IOV device with a configurable bridging function for bridging frames from a source entity to a destination entity, both entities running on a server;
a port receiving a frame from the source entity running on the server targeted to the destination entity running on the server; and
a processing element bridging the frame locally within the IOV device if the bridging function is capable of and configured to bridge the frame locally to the destination entity, and otherwise transmitting the frame through an Ethernet port over a physical link to an external switching device, so that the external switching device bridges the frame between the source and destination entities.

20. A physical network interface of claim 19, wherein the IOV device is a SR-IOV (single-root input/output virtualization) device or a MR-IOV (multi-root input/output virtualization) device.

* * * * *